US012402214B2

(12) United States Patent
Schlipf

(10) Patent No.: US 12,402,214 B2
(45) Date of Patent: Aug. 26, 2025

(54) ELECTRIC HEATER

(71) Applicant: Türk & Hillinger GmbH, Tuttlingen (DE)

(72) Inventor: Andreas Schlipf, Tuttlingen (DE)

(73) Assignee: TÜRK & HILLINGER GMBH, Tuttlingen (DE)

( * ) Notice: Subject to any disclaimer, the term of this patent is extended or adjusted under 35 U.S.C. 154(b) by 295 days.

(21) Appl. No.: 17/189,845

(22) Filed: Mar. 2, 2021

(65) Prior Publication Data

US 2021/0298131 A1 Sep. 23, 2021

(30) Foreign Application Priority Data

Mar. 4, 2020 (DE) ..................... 20 2020 101 182.0

(51) Int. Cl.
*H05B 3/46* (2006.01)
*H05B 3/44* (2006.01)

(52) U.S. Cl.
CPC ......... *H05B 3/46* (2013.01); *H05B 2203/004* (2013.01); *H05B 2203/016* (2013.01); *H05B 2203/017* (2013.01)

(58) Field of Classification Search
CPC ... H05B 3/46; H05B 3/44; H05B 3/48; H05B 2203/004; H05B 2203/017; H05B 2203/016; H05B 2203/003
USPC .......................................................... 219/541
See application file for complete search history.

(56) References Cited

U.S. PATENT DOCUMENTS 1,032,267 A * 7/1912 Bastian .................... H05B 3/42 338/226
1,334,850 A * 3/1920 Henri ....................... H05B 3/00 313/355
1,729,483 A * 9/1929 Koch ....................... H02G 3/06 285/280
1,971,971 A * 8/1934 Emil .................... A47J 37/0611 99/341
2,032,416 A * 3/1936 Hunt ........................ H02G 3/06 16/108
2,322,988 A * 6/1943 Wiegand .................. H05B 3/48 338/238
2,344,908 A * 3/1944 Whitman ................. A45D 4/12 132/229
2,464,147 A * 3/1949 Myers ..................... A47J 37/08 29/610.1

(Continued)

FOREIGN PATENT DOCUMENTS

CN 110461049 A 11/2019
CN 110547042 A 12/2019

(Continued)

OTHER PUBLICATIONS

Chinese Office Action dated Feb. 18, 2025 in Chinese Application No. 202110163187.7.

*Primary Examiner* — Eric S Stapleton
(74) *Attorney, Agent, or Firm* — Panitch Schwarze Belisario & Nadel LLP

(57) ABSTRACT

An electrical heating device with a tubular metal jacket and with at least one electrical heating element, which is arranged electrically isolated from the tubular metal jacket in an interior of the tubular metal jacket. The electrical heating element runs parallel to a tube center axis of the tubular metal jacket and has a wave-like shape such that wave peaks and wave valleys are produced.

19 Claims, 6 Drawing Sheets

(56) References Cited

U.S. PATENT DOCUMENTS

| | | | | | |
|---|---|---|---|---|---|
| 2,553,875 | A | * | 5/1951 | Shaw | H05B 3/44 338/234 |
| 2,680,183 | A | * | 6/1954 | Gomersall | H05B 3/44 338/237 |
| 2,747,072 | A | * | 5/1956 | Lawser | H05B 3/16 219/539 |
| 2,772,336 | A | * | 11/1956 | Merrick | H05B 3/44 338/237 |
| 2,870,316 | A | * | 1/1959 | Ferguson, Jr. | F24C 7/082 340/655 |
| 2,989,613 | A | * | 6/1961 | Morey | H05B 3/56 219/541 |
| 3,086,101 | A | * | 4/1963 | Scofield | H05B 3/30 338/308 |
| 3,310,769 | A | * | 3/1967 | Simmons | H05B 3/48 219/544 |
| 3,438,128 | A | * | 4/1969 | Sims | H05B 3/48 338/293 |
| 3,471,680 | A | * | 10/1969 | Kelm | H05B 3/0076 219/461.1 |
| 3,512,114 | A | * | 5/1970 | Dzaack | H05B 3/48 338/273 |
| 3,584,198 | A | * | 6/1971 | Doi | H05B 3/286 219/544 |
| 3,612,827 | A | * | 10/1971 | Dills | H05B 3/748 338/285 |
| 3,612,828 | A | * | 10/1971 | Siegla | H05B 3/74 338/285 |
| 3,612,829 | A | * | 10/1971 | Evans | H05B 3/74 219/460.1 |
| 3,646,321 | A | * | 2/1972 | Siegla | F24C 15/102 219/465.1 |
| 3,678,249 | A | * | 7/1972 | Lennox | H05B 3/48 219/544 |
| 3,800,691 | A | * | 4/1974 | Eaton, Jr. | F24C 7/087 99/393 |
| 3,839,623 | A | * | 10/1974 | Portmann | H05B 3/06 219/544 |
| 3,878,350 | A | * | 4/1975 | Takagi | H05B 6/6482 219/757 |
| 3,881,163 | A | * | 4/1975 | Lindroth | H05B 3/06 29/511 |
| 3,968,346 | A | * | 7/1976 | Cooksley | F24H 1/225 392/377 |
| 3,977,073 | A | * | 8/1976 | Shirey | H05B 3/48 205/213 |
| 4,241,292 | A | * | 12/1980 | Kreick | H05B 3/44 392/407 |
| 4,480,176 | A | * | 10/1984 | Raskov | H05B 3/76 219/532 |
| 4,518,850 | A | * | 5/1985 | Grasso | G05D 23/275 219/448.11 |
| 4,551,614 | A | * | 11/1985 | Johnson | F24C 7/062 338/311 |
| 4,628,189 | A | * | 12/1986 | Danko | H05B 3/32 219/532 |
| 4,641,010 | A | * | 2/1987 | Abura | A45D 1/18 338/285 |
| 4,669,181 | A | * | 6/1987 | Porzky | F27D 1/0036 29/850 |
| 4,675,512 | A | * | 6/1987 | Doucet | B29C 61/10 219/535 |
| 4,808,793 | A | * | 2/1989 | Hurko | F24H 1/102 392/480 |
| 5,124,534 | A | * | 6/1992 | Williams | H05B 3/32 219/532 |
| 5,155,798 | A | * | 10/1992 | Van Denend | H05B 3/009 338/237 |
| 5,293,446 | A | * | 3/1994 | Owens | F28F 1/06 122/18.1 |
| 5,329,098 | A | * | 7/1994 | Howard | F24H 9/1818 392/350 |
| 5,408,577 | A | * | 4/1995 | Weber, Jr. | H05B 3/12 219/535 |
| 5,431,886 | A | * | 7/1995 | Rolf | F01N 3/2026 392/490 |
| 5,549,078 | A | * | 8/1996 | Annecharico | B01D 1/0017 392/397 |
| 5,862,303 | A | * | 1/1999 | Adar | F24H 1/142 148/403 |
| 5,930,458 | A | * | 7/1999 | Yane | F24H 1/121 392/492 |
| 5,995,711 | A | * | 11/1999 | Fukuoka | B60H 1/00328 219/202 |
| 6,005,225 | A | * | 12/1999 | Kowalski | H01L 21/67098 219/390 |
| 6,055,360 | A | * | 4/2000 | Inoue | F24H 3/0435 165/151 |
| 6,097,007 | A | * | 8/2000 | Wang | A01K 63/065 392/408 |
| 6,191,400 | B1 | * | 2/2001 | Cunningham | H05B 3/48 219/544 |
| 6,253,121 | B1 | * | 6/2001 | Cline | H02H 5/105 361/115 |
| 6,282,370 | B1 | * | 8/2001 | Cline | F24H 15/345 392/485 |
| 6,509,554 | B2 | * | 1/2003 | Howard | H05B 3/06 219/536 |
| 6,577,926 | B1 | * | 6/2003 | Chang | G05B 9/02 219/490 |
| 6,909,843 | B1 | * | 6/2005 | Fabrizio | F24H 15/37 392/485 |
| 7,064,301 | B2 | * | 6/2006 | Han | F24H 3/0435 219/202 |
| 7,324,746 | B2 | * | 1/2008 | Tanaka | F24H 1/142 219/541 |
| 7,348,521 | B2 | * | 3/2008 | Lee | F24C 15/006 219/541 |
| 8,104,434 | B2 | * | 1/2012 | Fabrizio | F24H 9/2028 392/485 |
| 8,426,779 | B2 | * | 4/2013 | Schlipf | H05B 3/48 219/628 |
| 8,536,497 | B2 | * | 9/2013 | Kim | E21B 43/30 219/544 |
| 2002/0117495 | A1 | * | 8/2002 | Kochman | F24D 13/024 219/549 |
| 2003/0189037 | A1 | * | 10/2003 | Kochman | H05B 3/58 219/549 |
| 2004/0211771 | A1 | * | 10/2004 | Crandell | H05B 3/44 219/544 |
| 2006/0289474 | A1 | * | 12/2006 | Johnson | H05B 3/48 219/544 |
| 2007/0023418 | A1 | * | 2/2007 | Schlipf | H05B 3/04 219/532 |
| 2009/0025399 | A1 | * | 1/2009 | Kamen | C02F 1/18 165/184 |
| 2009/0034947 | A1 | * | 2/2009 | Tsai | H05B 3/44 392/407 |
| 2011/0070004 | A1 | * | 3/2011 | Mizumo | H05B 3/34 399/333 |
| 2011/0240269 | A1 | * | 10/2011 | Mackenzie | F28D 7/0025 165/141 |
| 2012/0055917 | A1 | * | 3/2012 | Kimmins | F24H 1/202 219/553 |
| 2012/0063755 | A1 | * | 3/2012 | Lucker | F24H 15/238 392/470 |
| 2012/0275775 | A1 | * | 11/2012 | Iskrenovic | F24H 9/14 392/483 |
| 2012/0315024 | A1 | * | 12/2012 | Obst | F24H 1/009 392/465 |
| 2013/0056456 | A1 | * | 3/2013 | Schlipf | H05B 6/06 219/546 |
| 2014/0103028 | A1 | * | 4/2014 | Schlipf | H05B 3/44 219/536 |
| 2014/0263282 | A1 | * | 9/2014 | Riley | H05B 3/06 219/546 |
| 2015/0001206 | A1 | * | 1/2015 | Schlipf | H01C 3/14 219/544 |

(56) References Cited

U.S. PATENT DOCUMENTS

| | | | | |
|---|---|---|---|---|
| 2015/0114949 | A1* | 4/2015 | Lee | H05B 3/48 219/534 |
| 2015/0351157 | A1* | 12/2015 | Cho | H05B 3/44 219/541 |
| 2016/0057813 | A1* | 2/2016 | Schlipf | H05B 6/06 219/541 |
| 2017/0071033 | A1* | 3/2017 | Schlipf | H05B 1/0297 |
| 2017/0118802 | A1* | 4/2017 | Lee | H05B 3/48 |
| 2019/0034294 | A1 | 1/2019 | Tirado | |
| 2021/0112629 | A1* | 4/2021 | Schlipf | H05B 3/02 |
| 2021/0298131 | A1* | 9/2021 | Schlipf | H05B 3/46 |

FOREIGN PATENT DOCUMENTS

| | | | |
|---|---|---|---|
| DE | 1917256 | A1 | 10/1970 |
| DE | 102015102728 | A1 | 8/2016 |
| WO | 2018190193 | A1 | 10/2018 |

* cited by examiner

M
14
141
11
10
12
Q
13
A1
A2
X
Y
q
D 121
122

26
21
20
25

22
222
221
24
241
24
23
26
21
25
222
20
221
22

21
25
22
d
Y
D
23

21
23
D
d
Y
22
25

40
41
42
43
44
441
421
422
Q
A1
A2
D
42a
42b
42c

Q
51
53
52
A1
D
q

Q
53
52
51
A2
D
q 51
50
522
521
53
52
54
541

52
522
521
54
541

522
521
52

ELECTRIC HEATER

CROSS-REFERENCE TO RELATED APPLICATION

This application claims priority under 35 U.S.C. § 119 to German Patent Application No. 20 2020 101 182.0, filed on Mar. 4, 2020, the disclosure of which is incorporated herein by reference in its entirety.

BACKGROUND OF THE INVENTION

The invention relates to an electrical heating device with the features of the preamble of the claims and as disclosed herein.

Electrical tubular heating elements are a variant of electrical heating devices that have been known for many years. They are distinguished in that the electrical heating element is arranged inside a tubular metal jacket, wherein it is electrically insulated in the radial direction relative to the tubular metal jacket by being embedded in an electrically insulating, but good heat-conducting material, in many cases, e.g., magnesium oxide, in order to prevent undesired short circuits.

Especially in applications that have only very small installation space and that must be operated at relatively low voltages, e.g., a 12-V or 48-V on-board electrical system for a passenger car, which means that high currents must flow to achieve the desired heating power, there has always been the problem of housing a resistor with a relatively large wire cross section in such a narrow space so that this resistor also withstands temperature cycle loading over a long period of time.

BRIEF SUMMARY OF THE INVENTION

This problem is solved by an electrical heating device with the features of the preferred claimed invention. Advantageous improvements of the invention are the subject matter of the dependent claims.

The electrical heating device according to the invention has a tubular metal jacket and at least one electrical heating element which is arranged electrically insulated from the tubular metal jacket in an interior of the tubular metal jacket.

It is essential to the invention that the electrical heating element runs parallel to a center axis of the tubular metal jacket and has a wave-like shape, so that wave peaks and wave valleys are produced. Preferably, it runs in the direction perpendicular to the direction in which the wave peaks and wave valleys deviate from the center axis of the tubular metal jacket from the profile direction specified by the profile of the center axis of the tubular metal jacket and which is simultaneously perpendicular to the profile direction of the tubular metal jacket, with the electrical heating element being essentially planar.

The big advantages of such a wave-like shape, which are produced, e.g., by shaping, especially bending, or by working from solid metal, or can be assembled, in particular, from multiple parts, are that, in contrast to known elongated electrical heating elements, which run parallel to a center axis of the tubular metal jacket, for the electrical heating element according to the invention, the mechanical loading due to temperature cycle loading can be effectively reduced and absorbed by this shaping, while simultaneously, in contrast to the known coiled electrical heating elements, a wave-like shape—preferably generated by a shaping of the heating element before its installation—can also be realized with electrical heating elements with a larger cross-sectional surface area.

Another advantage of the wave-like shape is that a heating coil used in a tight installation space has only a small coil interior due to the resulting tight coiling and this interior can be filled with electrically insulating material only with a lot of difficulty, because a connector wire or connector pin is in the way. These problems are effectively avoided with a wave-like shape of the electrical heating element.

The local cross section of the tubular metal jacket running perpendicular to the center axis and thus also to the profile direction of the tubular metal jacket is freely selectable; it could be circular, oval, or rectangular, in particular, square—wherein the interior of the tubular metal jacket is viewed as belonging to the cross section. It could also be changed by shaping after the assembly of the electrical heating device; for example, a circular cross section could be pressed into a square shape or a square cross section could be shaped into a rounded cross section, for example, by means of a rounding, compression step, in particular, rolling.

According to one especially preferred improvement of the invention, the electrical contact to the electrical heating element is realized by means of a connector wire or connector pin, whose cross section is greater than the cross section of the electrical heating element and which is inserted in the interior of the tubular metal jacket. In this way, it can be ensured, in particular, that the heating effect takes place only on targeted, selected sections of the electrical heating device.

If, in such an embodiment, the electrical heating element has a connection section constructed as a flat ribbon and the electrical contact between the connector wire or connector pin and the electrical heating element is formed such that the connection section of the electrical heating element contacts a peripheral surface of the connector wire or connector pin, and is connected, in particular, welded, to this surface, a very simple electrical connection that can be reliably produced between the connector wire or connector pin is realized. This applies especially when at least the side of the connection section adjacent to the peripheral side of the connector wire or connector pin is adapted to the contour of the peripheral surface, e.g., is curved for a cylindrical connector pin. For example, for such an embodiment, the contacts to be welded are optimally contacted at the top and bottom by weld electrodes, so that, in particular, in this arrangement, resistive welding with weld monitoring is made possible with process assurance in series production.

In such an embodiment with a connector wire or connector pin, it is especially preferred that the connector wire or connector pin has at least one channel that forms an access to the interior of the tubular metal jacket. By means of such a channel, the filling of the tube interior with the electrically insulating material, preferably magnesium oxide powder or magnesium oxide granulate, is simplified, which is especially important for small, installation-space-limited designs, in order to be able to produce them simply.

The wave-shaped design of the electrical heating element according to the invention with wave peaks and wave valleys make it possible to form, in particular, embodiments with very good utilization of the available installation space, which can be achieved, in particular, if the distance between the maximum of the wave peaks and an inner surface of the tubular metal jacket and/or the distance between the minimum of the wave valleys and an inner surface of the tubular metal jacket is less than 20%, preferably less than 10%, most preferred less than 5% of the distance between points of the inner surface of the tubular metal jacket opposite each other in the distance direction and/or less than 2 mm, preferably less than 1 mm, most preferred less than or equal to 0.6 mm, so that the height of the tubular metal jacket, i.e., the direction in which the wave peaks and wave valleys are offset from the center axis of the tubular metal jacket, is utilized as effectively as possible. In this way, the heat dissipation to the surrounding environment can also be optimized.

For such an effective utilization of the available installation space, it can also be beneficial if the electrical heating device has an electrical heating element with a cross section that has a larger and a smaller direction of extent that are preferably perpendicular to each other, which is the case, in particular, with an oval or rectangular cross section. Preferably, this cross section is oriented within the tubular metal jacket so that its larger extent runs in the direction of the width of the tubular metal jacket, that is, it is oriented in a direction that is perpendicular both to the profile direction of the electrical heating device that is given by the center axis of the tubular metal jacket and defines the length, and also to the height of the tubular metal jacket, i.e., the direction in which the wave peaks and wave valleys are offset from the center axis of the tubular metal jacket.

According to one advantageous improvement of the invention, the electrical heating element is constructed from multiple layers. In this way, on one hand an especially good utilization of the installation space can be achieved for curved inner contours of the tubular metal jacket, which can also make it possible to minimize the distance to the tubular metal jacket; on the other hand, this measure can be used for optimizing the resistance of the electrical heating element.

Another option that can be further beneficial for adapting the electrical heating element as good as possible to the inner contours of the tubular metal jacket consists in that the electrical heating element or the cross section of the electrical heating element is curved at least in some sections. This can also contribute to mechanical stabilization. In particular, it is advantageous here if the electrical heating element is curved in the opposite sense in the area of the maximum of the wave peaks and in the area of the minimum of the wave valleys. Here, curved means, in particular, that there is a bend in the direction relative to the center axis of the tubular metal jacket.

Especially preferred is an embodiment of the invention in which the electrical heating element has a cross section, which has a direction of greatest cross section and in which the distance between the inner surface of the tubular metal jacket and the side of the electrical heating element facing this surface in the direction of greatest cross section is less than 20%, preferably less than 10%, most preferred less than 5% of the distance in the direction of greatest cross section between the inner surfaces of the tubular metal jacket opposite each other in this direction relative to the height of the electrical heating element and/or less than 2 mm, preferably less than 1 mm, most preferred less than 0.6 mm. In this way, not only can the utilization of the available installation space be further optimized, but the heat dissipation is also further improved.

In particular, if the electrical heating element is shaped so that it runs at least in some sections at a very small distance to the tubular metal jacket, for ensuring consistent electrical insulation from the tubular metal jacket it is helpful if the electrical heating element is electrically insulated from the tubular metal jacket at least in some sections by at least one molded part made from an electrically insulating material with an interior in which the electrical heating element is arranged at least in some sections.

In particular, for improvements of this embodiment, in the interior of the tubular metal jacket, in addition to the molded part made from an electrically insulating material, there is another electrically insulating material, in particular, a powder or granulate made from the same electrically insulating material from which the molded part is made or from a different electrically insulating material.

In another advantageous improvement of the invention, it is provided that the geometry, in particular, the extent of the electrical heating element or its cross section in a side view is narrower than in a top view.

Especially preferred here is a wave-like shape, in which the distance between two adjacent wave peaks or two adjacent wave valleys is less than three times, preferably less than two times, and especially preferred less than one times the height difference between a wave peak and a wave valley.

BRIEF DESCRIPTION OF THE SEVERAL VIEWS OF THE DRAWING

The foregoing summary, as well as the following detailed description of the preferred invention, will be better understood when read in conjunction with the appended drawings. For the purpose of illustrating the preferred invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figures 1A, 1B, 1C, 1D, 1E, 1F:
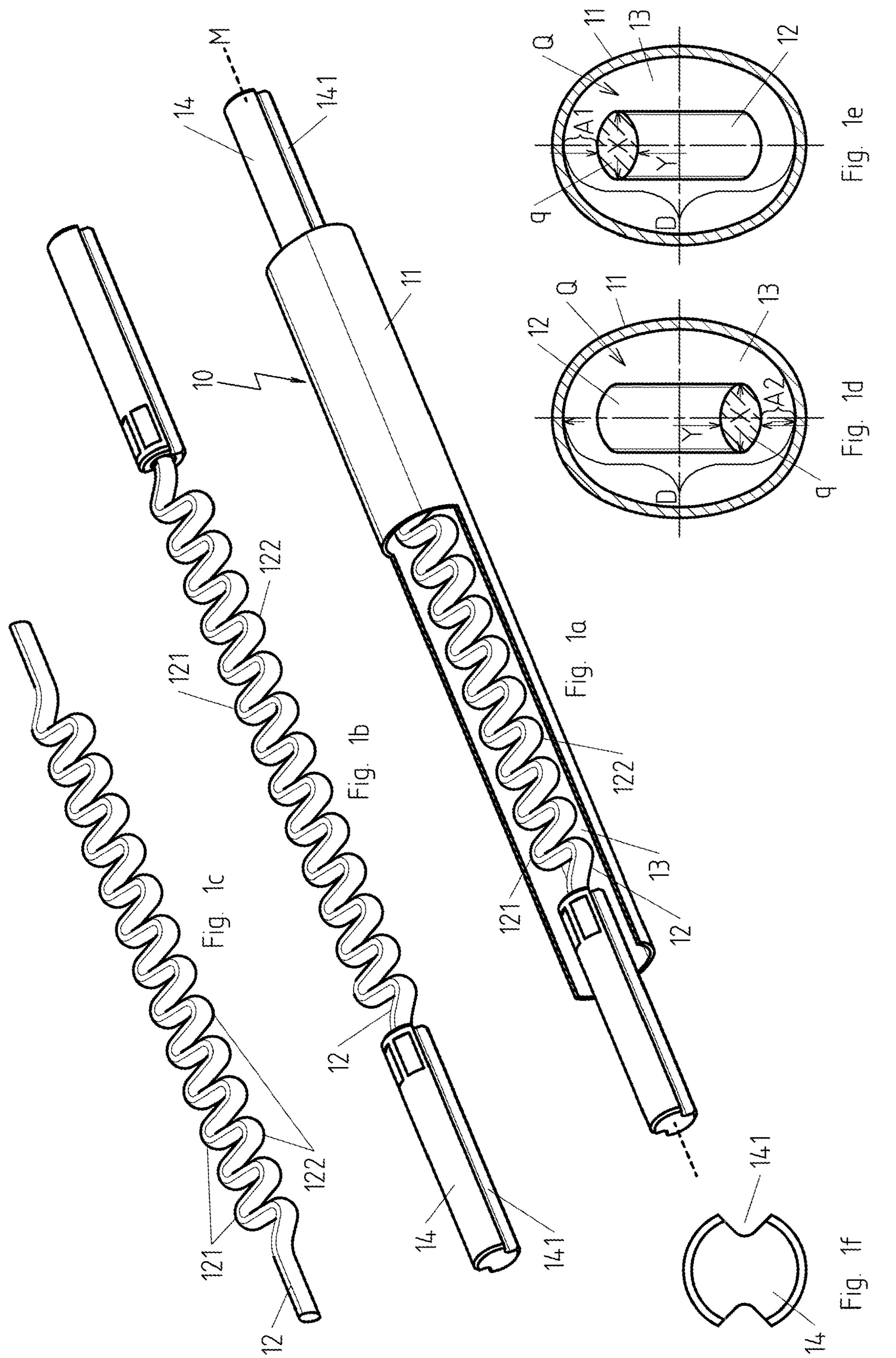
FIG. 1*a* is a top perspective, partial cross-sectional view of a first embodiment of an electrical heating device in a partially opened representation.
FIG. 1*b* is a top perspective view of an assembly made from a connector pin and an electrical heating element of the electrical hearing device from FIG. 1*a;*
FIG. 1*c* is a top perspective view of the electrical heating element of the electrical heating device from FIG. 1*a;*
FIG. 1*d* is a cross-sectional view through the electrical heating device from FIG. 1*a* at a wave minimum.
FIG. 1*e* is a cross-sectional view through the electrical heating device from FIG. 1*a* at a wave maximum.
FIG. 1*f* is a cross-sectional view through a connector pin of the electrical heating device from FIG. 1*a;*

FIG. 1*a* shows a first embodiment of an electrical heating device 10 in a partially opened representation. Visible here are the partially opened tubular metal jacket 11, which has, in the shown example, an oval cross section Q, which can also be seen, in particular, in the cross-sectional representations of FIGS. 1*d* and 1*e*. In the interior of the tubular metal jacket 11, an electrical heating element 12 is embedded in an electrically insulating, transparent material 13, for example, MgO powder or MgO granulate.

The electrical heating element 12, which here has an oval cross section q with a larger extent direction x and a smaller extent direction y, but basically can also have a different cross section q, is supplied, as can be seen especially well in FIG. 1*b*, with electrical current by means of connector pins 14, which project out of the tubular metal jacket 11. The connector pins 14 here have, in the shown example, two channels 141 that are constructed as grooves and simplify the filling of the interior of the tubular metal jacket 11 with the electrically insulating material 13 during the production of the electrical heating device 10, which can be seen especially well in FIG. 1*f*. The electrical contact between connector pins 14 and electrical heating element 12 can be produced here in a known way, in particular, through welding, soldering, crimping, or clamping.

Especially important is the fact that the electrical heating element 12 running parallel to the tube center axis M has an undulating shape and has wave peaks 121 and wave valleys 122, which can be seen especially well in FIG. 1*c*.

The effects of this shape can be seen especially well in the cross-sectional representations of FIGS. 1*d* and 1*f* through the electrical heating device from FIG. 1*a* at a wave minimum, that is, the lowest point of a wave valley 122 and, respectively, at a wave maximum, that is, at the highest point of a wave peak 121. It has the result that the distance A1 between the maximum of the wave peaks 121 and the inner surface of the tubular metal jacket 11 and/or the distance A2 between the minimum of the wave valleys 122 and the inner surface of the tubular metal jacket 11 is less than 20% of the distance D between points of the inner surface of the tubular metal jacket 11 opposite each other in the distance direction, which leads to significantly better heat dissipation than for an electrical heating element with a profile elongated relative to the tube center axis M of the tubular metal jacket 11.

FIGS. 2*a* to 2*d* show a still uncompressed second embodiment of an electrical heating device 20 with tubular metal jacket 21, electrical heating element 22 with wave peaks 221 and wave valleys 222, electrically insulating material 23, and connector pins 24 with channels 241. The basic construction of the electrical heating device 20 corresponds to that of the electrical heating device 10, whose description can be expanded by referencing the previous descriptions. Important differences relative to the electrical heating device 10 are, in particular, that

- the tubular metal jacket 21 has an essentially rectangular cross section Q,
- the electrical heating element 22 is constructed as an undulating flat ribbon with rectangular cross section q, which has a larger extent direction x and a smaller extent direction y, and
- for the insulation of the electrical heating element 22 from the tubular metal jacket 21 there are additional molded parts 25 made from an-optionally different-electrically insulating material.

On the end, the electrical heating device 20 is closed with an end piece 26.

Figures 2A, 2B, 2C, 2D:
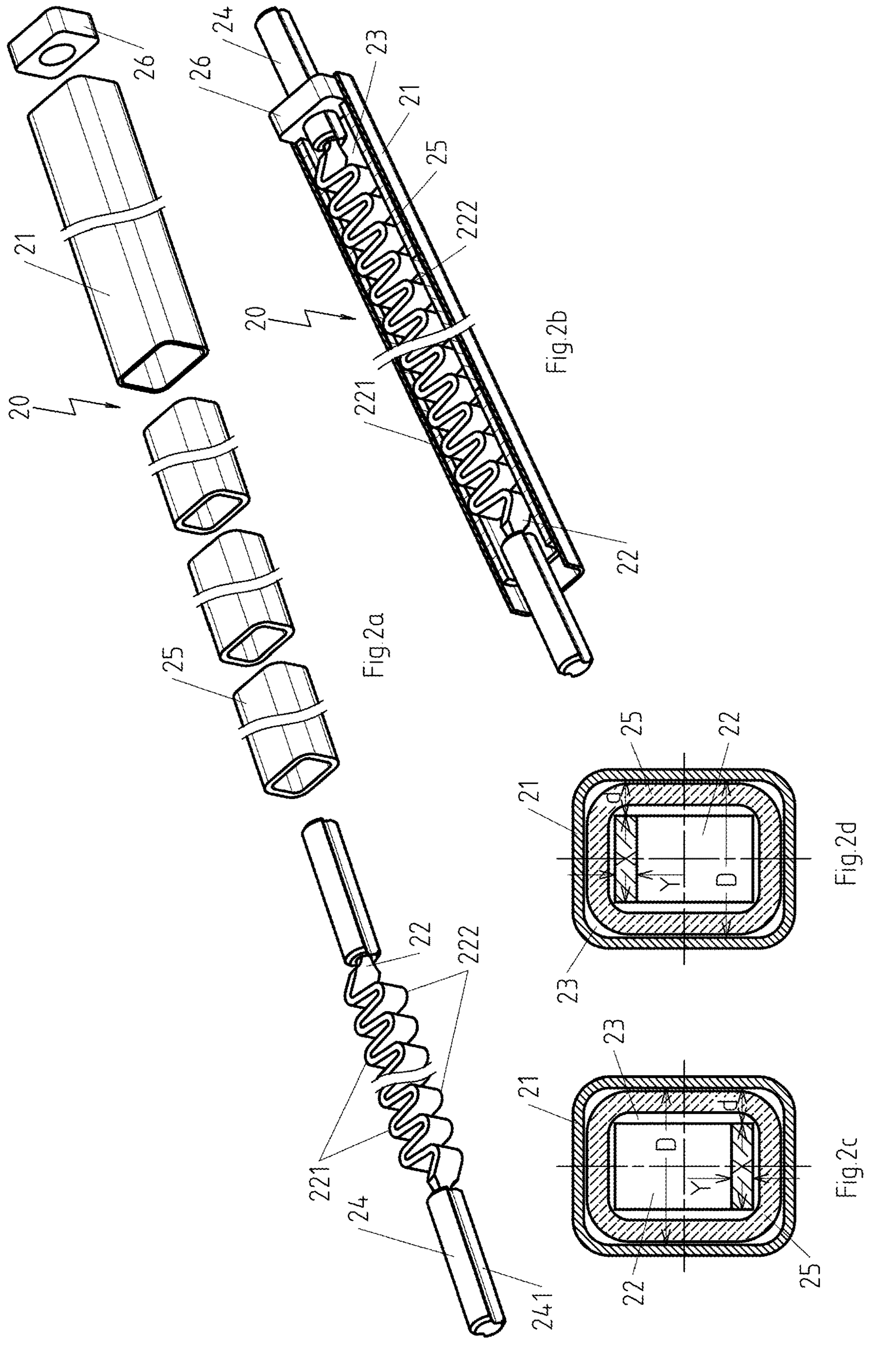
FIG. 2*a* is a top perspective, fragmentary, exploded view of a second embodiment of an electrical heating device.
FIG. 2*b* is a top perspective, fragmentary, cross-sectional view in an opened representation of the electrical heating device from FIG. 2*a;*
FIG. 2*c* is a cross-sectional view through the electrical heating device from FIG. 2*a* at a wave minimum.
FIG. 2*d* is a cross-sectional view through the electrical heating device from FIG. 2*a* at a wave maximum.
Figures 3A, 3B, 3C, 3D:
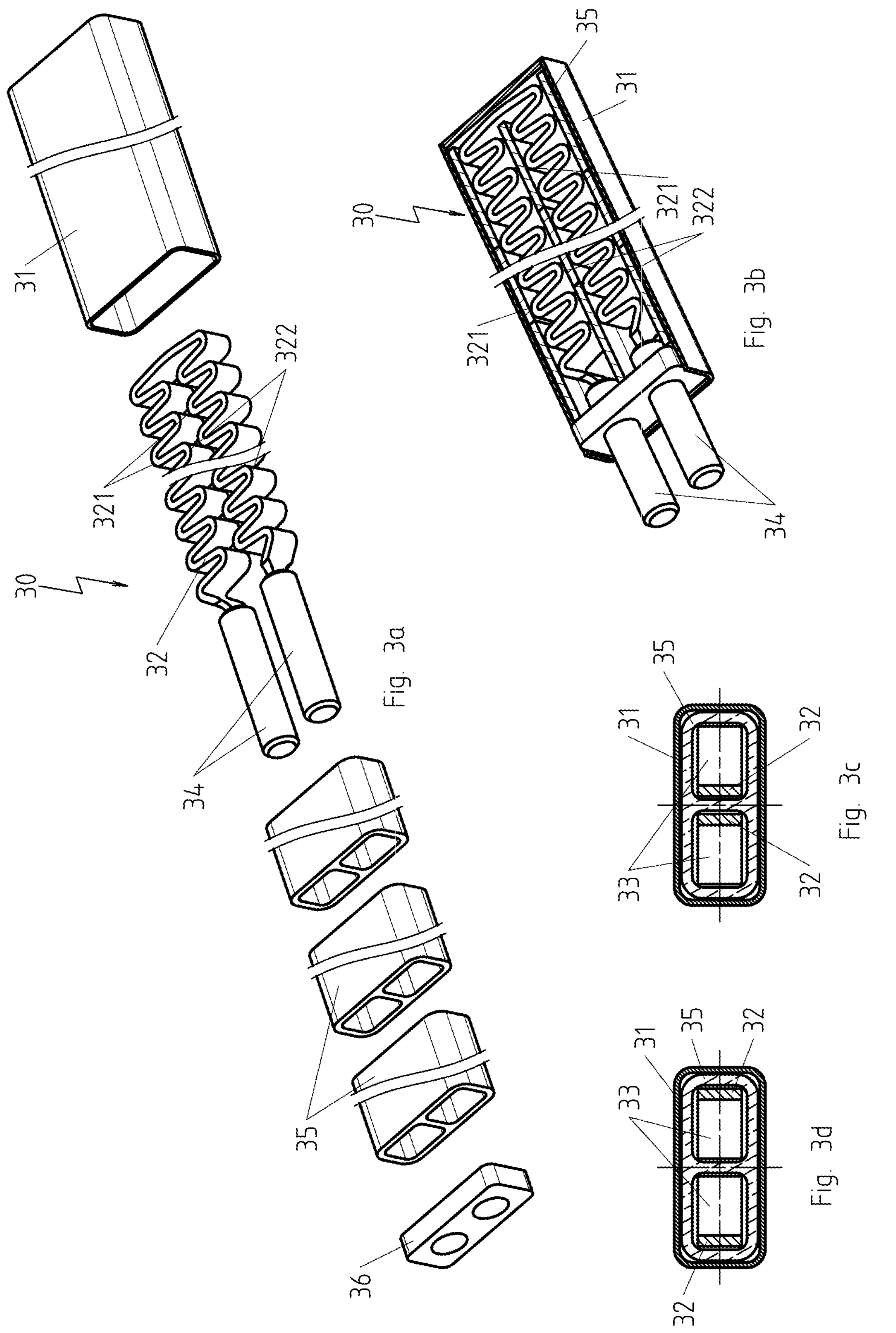
FIG. 3*a* is top perspective, fragmentary, exploded view of a third embodiment of an electrical heating device.
FIG. 3*b* is a top perspective, fragmentary, cross-sectional view in an opened representation of the electrical heating device from FIG. 3*a;*
FIG. 3*c* is a cross-sectional view through the electrical heating device from FIG. 3*a* at a wave minimum/wave maximum.
FIG. 3*d* is a cross-sectional view through the electrical heating device from FIG. 3*a* at a wave maximum/wave minimum.
Figures 4A, 4B, 4C, 4D, 4E, 4F:
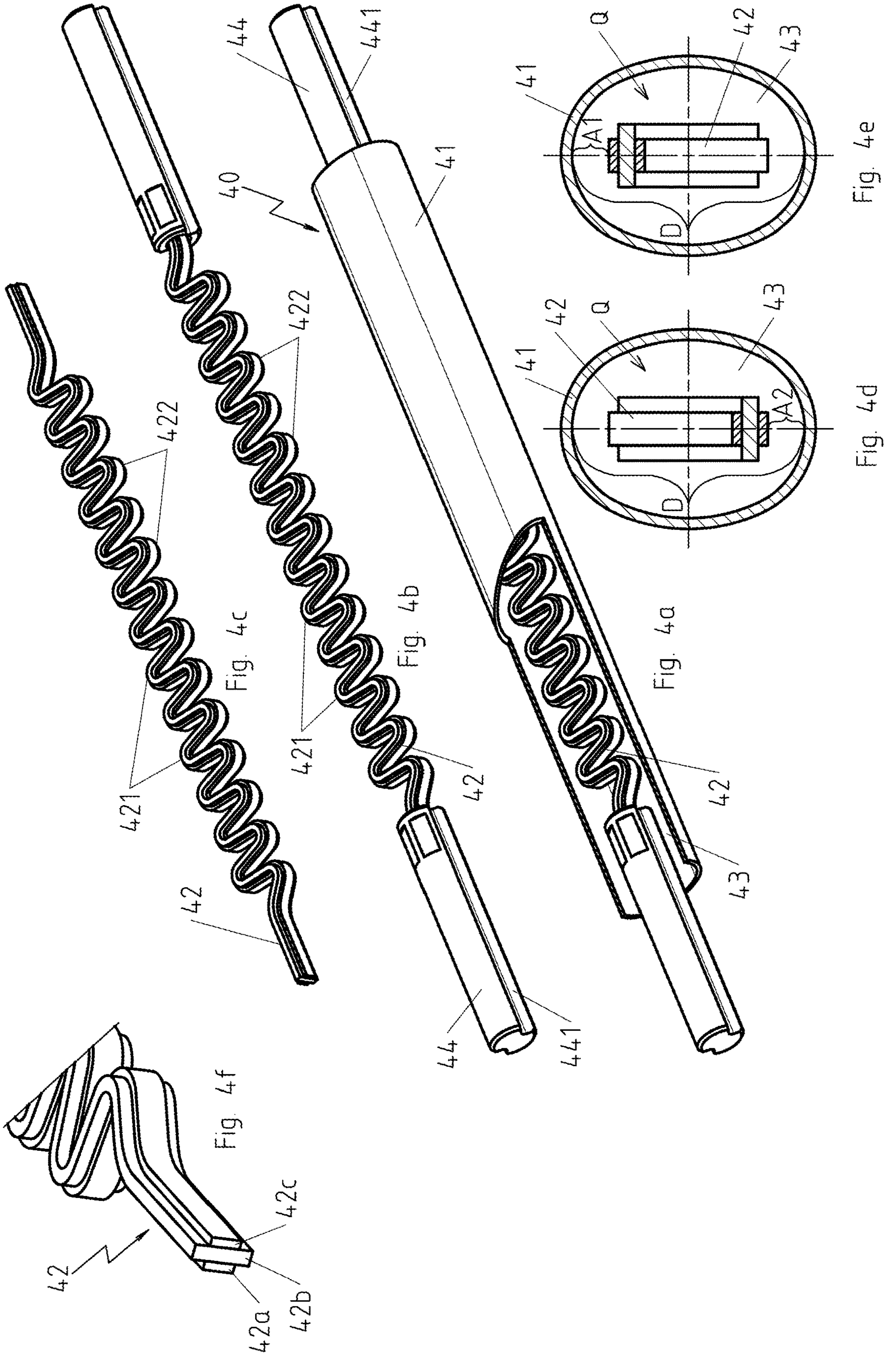
FIG. 4*a* is a top perspective, partial cross-sectional view of a fourth embodiment of an electrical heating device in a partially opened representation.
FIG. 4*b* is a top perspective view of an assembly made from a connector pin and electrical heating element of the electrical heating device from FIG. 4*a;*
FIG. 4*c* is a top perspective view of the electrical heating element of the electrical heating device from FIG. 4*a;*
FIG. 4*d* is an enlarged cross-sectional view through the electrical heating device from FIG. 4*a* at a wave minimum.
FIG. 4*e* is an enlarged cross-sectional view through the electrical heating device from FIG. 4*a* at a wave maximum.
FIG. 4*f* is an enlarged top perspective view of an end section of the electrical heating element from FIG. 4*c;*
Figures 5A, 5B, 5C, 5D, 5E:
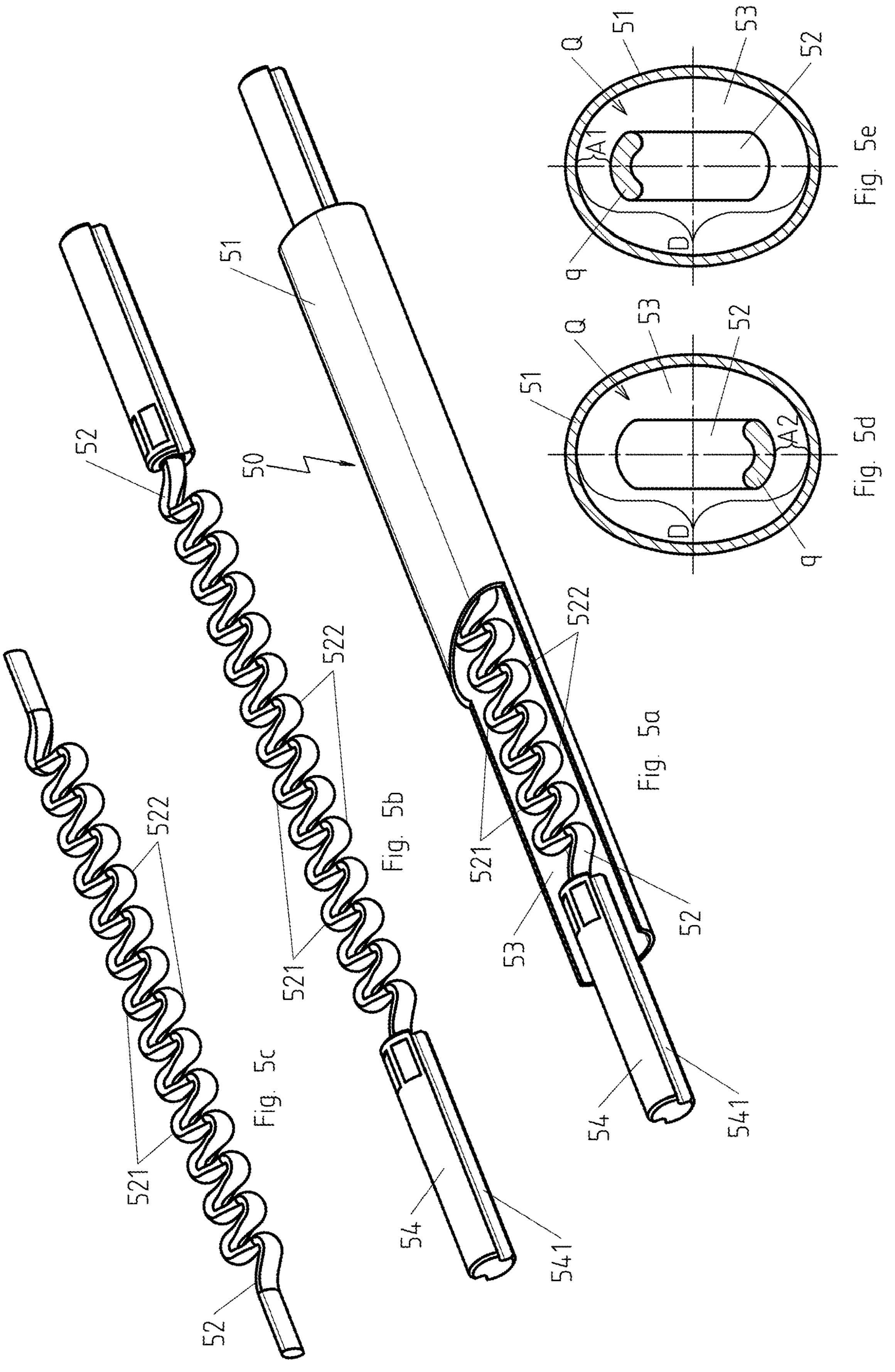
FIG. 5*a* is a top perspective, partial cross-sectional view of a fifth embodiment of an electrical heating device in a partially opened representation.
FIG. 5*b* is a top perspective view of an assembly made from a connector pin and electrical heating element of the electrical heating device from FIG. 5*a;*
FIG. 5*c* is a top perspective view of the electrical heating element of the electrical heating device from FIG. 5*a;*
FIG. 5*d* is a cross-sectional view through the electrical heating device from FIG. 5*a* at a wave minimum.
FIG. 5*e* is a cross-sectional view through the electrical heating device from FIG. 5*a* at a wave maximum.

As can be seen, in particular, in FIGS. 2*c* and 2*d*, it is achieved in this embodiment through the adaptation of the cross section Q of the tubular metal jacket 21 and the cross section q of the electrical heating element 22 that the electrical heating element runs at a very small distance from the inside of the tubular metal jacket 21, which leads to very good heat dissipation.

The direction x is here the largest cross section direction, and it is clear in FIGS. 2*c* and 2*d* that the distance between the inner surface of the tubular metal jacket 21 and side of the electrical heating element 22 facing this surface in the largest cross section direction x is less than 20% of the distance d in the largest cross section direction x between the inner surfaces of the tubular metal jacket 21 opposite each other in this direction relative to the height of the electrical heating element 22.

The use of molded parts 25 has proven to be very advantageous here to be able to guarantee the insulation between the electrical heating element 22 and tubular metal jacket 21 in a way that enables reliable processing.

FIGS. 3*a* to 3*d* show a third embodiment of an electrical heating device 30 with tubular metal jacket 31, electrical heating element 32 with wave peaks 321 and wave valleys 322, electrically insulating material 33 and connector pins 34, which here, however, do not have any channels, and additional electrically insulating molded part 35. The basic configuration of the electrical heating device 30 corresponds to that of the electrical heating device 20, whose description can be expanded by referencing the previous descriptions, with the difference that the electrical heating device 30 is an electrical heating device, in which the connections are arranged only on one side. In particular, for the electrical heating device 30, the tubular metal jacket 31 also has an essentially rectangular cross section Q and the electrical heating element 32 is constructed as an undulating flat ribbon with rectangular cross section q.

FIGS. 4*a* to 4*f* show a fourth embodiment of an electrical heating device 40 with tubular metal jacket 41, electrical heating element 42 with wave peaks 421 and wave valleys 422, electrically insulating material 43 and connector pins 44 with channels 441. The basic construction of the electrical heating device 40 corresponds to that of the electrical heating device 10, whose description can be expanded by referencing the previous descriptions. An important difference relative to the electrical heating device 10, however, is in the construction of the electrical heating element 42, which is here constructed with three layers 42*a*,42*b*,42*c*, as can be seen especially clearly in FIG. 4*f*.

FIGS. 5*a* to 5*e* show a fifth embodiment of an electrical heating device 50 with tubular metal jacket 51, electrical heating element 52 with wave peaks 521 and wave valleys 522, electrically insulating material 53, and connector pins 54 with channels 541. The basic construction of the electrical heating device 50 again corresponds to that of the electrical heating device 10, whose description can be expanded by referencing the previous descriptions. One important difference relative to the electrical heating device 10 is here also in the construction of the electrical heating element 52, which has a curved construction, as can be seen especially clearly in FIGS. 5*d* and 5*e*.

Figure 6:
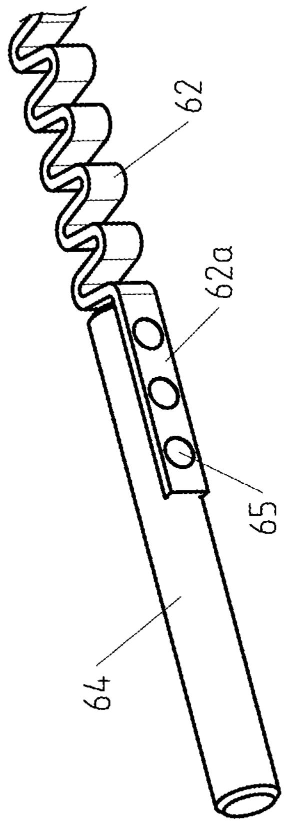
FIG. 6 is a top perspective view of a connector pin with an end of an electrical heating element arranged thereon.

FIG. 6 shows a top view of a connector wire or connector pin 64 with the end of an electrical heating element 62 having a wave-like shape arranged thereon. Here, the electrical heating element 62 has a connection section 62*a* constructed as a flat ribbon and the electrical contact between the connector wire or connector pin 64 and the electrical heating element 62 is formed such that the connection section 62*a* of the electrical heating element contacts a peripheral surface of the connector wire or connector pin 64 and is connected, in particular, welded by weld spots 65, to this surface.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE SYMBOLS

10, 20, 30, 40, 50 Electrical heating device
11, 21, 31, 41, 51 Tubular metal jacket
12, 22, 32, 42, 52, 62 Electrical heating element
13, 23, 33, 43, 53 Electrically insulating material
14, 24, 34, 44, 54, 64 Connector pin
25, 35 Molded part
26, 36 End piece
42*a*, 42*b*, 42*c* Layer
62*a* Connection section
65 Weld spot
121, 221, 321, 421, 521 Wave peak
122, 222, 322, 422, 522 Wave valley
141, 241, 341, 441, 541 Channel
M Tube center axis
Q Cross section
q Cross section
x Direction of largest cross section
y Direction of smallest cross section
D Distance
d Distance
A1 Distance
A2 Distance

The invention claimed is:

1. An electrical heating device comprising:

a tubular metal jacket; and an electrical heating element, arranged in and electrically isolated from the tubular metal jacket in an interior of the tubular metal jacket filled with electrically insulating and heat conducting material; the electrical heating element extending parallel to a tube center axis of the tubular metal jacket and having a wave-like shape defining wave peaks and wave valleys, wherein the wave peaks define a first side of the electrical heating element and the wave valleys define an opposing second side of the electrical heating element, a top surface of the electrical heating element between the first and second sides being flat, the interior of the tubular metal jacket having a larger cross-section as an outer shape compared to the wave peaks of the electrical heating element such that the electrical heating element is positionable inside of the tubular metal jacket, the electrical heating element being isolated electrically from the tubular metal jacket at least in some sections by a molded part made from an electrically insulating material with an interior, in which the electrical heating element is arranged within the interior of the molded part at least in some sections.

2. The electrical heating device according to claim 1, wherein an electrical contact to the electrical heating element is realized by a connector wire or connector pin, a cross section of the connector wire or connector pin is greater than a cross section of the electrical heating element and which is inserted in the interior of the tubular metal jacket.

3. The electrical heating device according to claim 2, wherein the electrical heating element has a connection section constructed as a flat ribbon and the electrical contact between the connector wire or connector pin and the electrical heating element is formed such that the connection section of the electrical heating element contacts a peripheral surface of the connector wire or connector pin and is connected, in particular, welded, to the peripheral surface.

4. The electrical heating device according to claim 2, wherein the connector wire or connector pin has at least one channel, the at least one channel forms an access to the interior of the tubular metal jacket.

5. The electrical heating device according to claim 1, wherein a first distance between a maximum of the wave peaks and an inner surface of the tubular metal jacket and the inner surface of the tubular metal jacket measured in a distance direction is less than 20% of a second distance between points of the inner surface of the tubular metal jacket opposite each other in the distance direction and less than 2 mm.

6. The electrical heating device of claim 5, wherein the first distance is less than 10% of the second distance and less than 1 mm.

7. The electrical heating device of claim 5, wherein the first distance is less than 5% of the second distance and less than 0.6 mm.

8. The electrical heating element of claim 5, wherein a distance between the inner surface of the tubular metal jacket and the first side of the electrical heating element facing in a direction of greatest cross section is less than 10% and less than 1 mm.

9. The electrical heating element of claim 5, wherein a distance between the inner surface of the tubular metal jacket and the first side of the electrical heating element facing in a direction of greatest cross section is less than 5% and less than 0.6 mm.

10. The electrical heating device according to claim 1, wherein the electrical heating element has an oval or a rectangular cross section.

11. The electrical heating device according to claim 1, wherein the electrical heating element is constructed from multiple layers.

12. The electrical heating device according to claim 1, wherein the electrical heating element is curved at least in some sections.

13. The electrical heating device according to claim 12, wherein the electrical heating element is curved in an opposite sense in an area of a maximum of the wave peaks and in an area of a minimum of the wave valleys.

14. The electrical heating device according to claim 1, wherein there is another electrically insulating material in the interior of the tubular metal jacket in addition to the molded part.

15. The electrical heating device according to claim 1, wherein a geometry of the electrical heating element in a side view is narrower than in a top view.

16. The electrical heating device according to claim 1, wherein a distance between two adjacent waves of the wave peaks and between two adjacent waves of the wave valleys is less than three times a height difference between a wave peak and a wave valley.

17. The electrical heating element of claim 16, wherein the distance between the two adjacent waves of the wave peaks and between the two adjacent waves of the wave valleys is less than two times the height difference between the wave peak and the wave valley.

18. The electrical heating element of claim 16, wherein the distance between the two adjacent waves of the wave peaks and between the two adjacent waves of the wave valleys is less than one times the height difference between the wave peak and the wave valley.

19. The electrical heating element of claim 1, wherein the electrical heating element has a cross-section with a larger extent direction and a smaller extent direction.

* * * * *